(12) United States Patent
Kofuji et al.

(10) Patent No.: US 12,454,764 B2
(45) Date of Patent: Oct. 28, 2025

(54) ELECTRODE CATALYST LAYER FOR CARBON DIOXIDE ELECTROLYSIS CELL, ELECTROLYSIS CELL AND CARBON DIOXIDE ELECTROLYSIS APPARATUS COMPRISING THE SAME

(71) Applicant: KABUSHIKI KAISHA TOSHIBA, Minato-ku (JP)

(72) Inventors: Yusuke Kofuji, Yokohama (JP); Akihiko Ono, Kita (JP); Yuki Kudo, Yokohama (JP); Asahi Motoshige, Ota (JP); Masakazu Yamagiwa, Yokohama (JP); Yoshitsune Sugano, Kawasaki (JP); Satoshi Mikoshiba, Yamato (JP); Ryota Kitagawa, Setagaya (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 92 days.

(21) Appl. No.: 16/563,546

(22) Filed: Sep. 6, 2019

(65) Prior Publication Data

US 2020/0270756 A1     Aug. 27, 2020

(30) Foreign Application Priority Data

Feb. 21, 2019   (JP) ................. 2019-029466

(51) Int. Cl.
*C25B 11/051*   (2021.01)
*B01J 21/18*    (2006.01)
(Continued)

(52) U.S. Cl.
CPC .............. *C25B 11/051* (2021.01); *C25B 3/23* (2021.01); *C25B 3/25* (2021.01); *C25B 9/23* (2021.01);
(Continued)

(58) Field of Classification Search
CPC ... C25B 11/0405; C25B 11/0489; C25B 3/02; C25B 3/04; C25B 9/08; C25B 9/10;
(Continued)

(56) References Cited

U.S. PATENT DOCUMENTS

| | | | |
|---|---|---|---|
| 7,094,492 B2 | 8/2006 | Matsubara et al. | |
| 2001/0026782 A1* | 10/2001 | Wang | B01J 23/60 |
| | | | 422/211 |

(Continued)

FOREIGN PATENT DOCUMENTS

| | | | |
|---|---|---|---|
| CN | 103545536 B | * | 10/2015 |
| EP | 0876335 B1 | * | 5/2000 |

(Continued)

OTHER PUBLICATIONS

Bitar et al. (WO 2014202856 A1, machine translation) (Year: 2014).*

(Continued)

*Primary Examiner* — Luan V Van
*Assistant Examiner* — Mofoluwaso S Jebutu
(74) *Attorney, Agent, or Firm* — Oblon, McClelland, Maier & Neustadt, L.L.P.

(57) ABSTRACT

The embodiments provide an electrode catalyst layer for an electrolysis cell, and also an electrolysis cell and a carbon dioxide electrolysis apparatus comprising that layer. The catalyst layer has a controlled porous structure, and can realize a high partial current density. The catalyst layer of the embodiment comprises carbonous catalyst carriers, a metallic catalyst loaded on the carriers, and an ion-conductive material. The catalyst layer contains pores of 5 to 200 μm diameters, and the pores have a volume per weight of the catalyst layer in the range of 3.0 to 10 mL/g in total.

19 Claims, 4 Drawing Sheets

(51) Int. Cl.
    *B01J 23/52* (2006.01)
    *C25B 3/23* (2021.01)
    *C25B 3/25* (2021.01)
    *C25B 9/23* (2021.01)
    *C25B 11/031* (2021.01)
    *C25B 11/043* (2021.01)
    *C25B 11/061* (2021.01)

(52) U.S. Cl.
    CPC ......... *C25B 11/031* (2021.01); *C25B 11/043* (2021.01); *C25B 11/061* (2021.01); *B01J 21/185* (2013.01); *B01J 23/52* (2013.01)

(58) Field of Classification Search
    CPC ........... C25B 3/25; C25B 3/26; C25B 11/051; C25B 11/054; C25B 11/052; C25B 11/065; C25B 3/23; C25B 11/031; C25B 11/043; C25B 11/061; B01J 35/1033; B01J 35/1076
    See application file for complete search history.

(56) References Cited

U.S. PATENT DOCUMENTS

| | | | | |
|---|---|---|---|---|
| 2003/0108481 | A1* | 6/2003 | Igarashi | C09C 1/50 204/194 |
| 2008/0261103 | A1* | 10/2008 | Ueda | H01M 8/1011 429/480 |
| 2012/0308912 | A1* | 12/2012 | Hong | H01M 4/9083 429/479 |
| 2014/0186576 | A1 | 7/2014 | Harmer et al. | |
| 2017/0073822 | A1* | 3/2017 | Kudo | C25B 3/04 |
| 2017/0073825 | A1* | 3/2017 | Sugano | C25B 1/04 |
| 2017/0183789 | A1* | 6/2017 | Matthews | C25B 9/08 |
| 2017/0247804 | A1* | 8/2017 | Yamada | C25B 15/08 |
| 2017/0279143 | A1 | 9/2017 | Tsukuda et al. | |
| 2018/0274108 | A1 | 9/2018 | Ono et al. | |
| 2018/0301726 | A1 | 10/2018 | Shintani et al. | |
| 2019/0226103 | A1* | 7/2019 | Kuhl | C25B 1/02 |
| 2019/0264340 | A1* | 8/2019 | Mitsushima | C25B 9/23 |
| 2020/0240023 | A1* | 7/2020 | Cave | C25B 3/03 |

FOREIGN PATENT DOCUMENTS

| | | | | |
|---|---|---|---|---|
| JP | 2000-353528 | A | 12/2000 | |
| JP | 2003-151564 | A | 5/2003 | |
| JP | 2010-167379 | A | 8/2010 | |
| JP | 2010277782 | A * | 12/2010 | |
| JP | 2017-91736 | A | 5/2017 | |
| JP | 2018-154898 | A | 10/2018 | |
| JP | 2018-181838 | A | 11/2018 | |
| WO | WO 2014/105798 | A1 | 7/2014 | |
| WO | WO-2014202856 | A1 * | 12/2014 | B01J 23/08 |
| WO | WO 2016/063922 | A1 | 4/2016 | |

OTHER PUBLICATIONS

A. Zlotorowicz, et al., "Tailored porosities of the cathode layer for improved polymer electrolyte fuel cell performance", Journal of Power Sources, 287, 2015, pp. 472-477.

Xiaoli Wang, et al., "A bi-functional micro-porous layer with composite carbon black for PEM fuel cells", Journal of Power Sources, 162, 2006, pp. 474-479.

* cited by examiner

ELECTRODE CATALYST LAYER FOR CARBON DIOXIDE ELECTROLYSIS CELL, ELECTROLYSIS CELL AND CARBON DIOXIDE ELECTROLYSIS APPARATUS COMPRISING THE SAME

CROSS-REFERENCE TO RELATED APPLICATIONS

This application is based upon and claims the benefit of priority from the prior Japanese Patent Application No. 2019-29466, filed on Feb. 21, 2019, the entire contents of which are incorporated herein by reference.

FIELD

Embodiments of the present disclosure relate to an electrode catalyst layer for a carbon dioxide electrolysis cell, and also relate to an electrolysis cell and a carbon dioxide electrolysis apparatus comprising that layer.

BACKGROUND

Recently, from the viewpoints of both energy problems and environmental problems, it has been demanded not only to convert renewable energy such as sunlight into electrical energy for practical use but also to transform the energy into a storable and transportable form. For the purpose of meeting the demand, artificial photosynthesis technology, with which chemical substances are produced by use of sunlight in a manner like photosynthesis of plants, has been progressively researched and developed. This technology opens the possibility of storing renewable energy in the form of storable fuel, and is hoped to produce chemical substances employable as industrial materials and thereby to create values.

As an apparatus for producing chemical substances by use of renewable energy such as sunlight, there is a known electrochemical reaction apparatus comprising, for example, a cathode which reduces carbon dioxide ($CO_2$) emitted from power plants, waste disposal facilities or the like and an anode which oxidizes water ($H_2O$). In this apparatus, the cathode reduces carbon dioxide to produce a carbon compound such as carbon monoxide (CO). When this type of apparatus is realized in the form of a cell (often referred to as "electrolysis cell"), it is thought advantageous to assemble the cell similarly to a fuel cell such as a polymer electric fuel cell (PEFC). Specifically, carbon dioxide is directly supplied to a catalyst layer of the cathode, and thereby it becomes possible to advance smoothly the reduction reaction of carbon dioxide.

However, if being in that cell form, the apparatus has a similar problem to that arising in a PEFC. Specifically, in order to increase the partial current density of the aimed carbon compound, it is necessary to make the cathode catalyst layer so porous that carbon dioxide can be evenly supplied to the whole layer. In view of that, pores serving as gas-transport paths in the catalyst layer have been variously studied in developments of PEFCs.

DETAILED DESCRIPTION

Embodiments will now be explained with reference to the accompanying drawings. Here, it should be noted that the drawings are schematic views and hence, for example, dimensions such as thickness and width of each component are not necessarily the same as real ones. Further, in some embodiments, the same numbers are assigned to essentially the same components and explanations thereof may be omitted.

An electrode catalyst layer for a carbon dioxide electrolysis cell according to the embodiment, comprises
  carbonous catalyst carriers,
  a metallic catalyst loaded on said carriers, and
  an ion-conductive material;
wherein said catalyst layer has a porous structure and contains pores of 5 to 200 μm diameters measured by a mercury injection method, and a volume of said pores per weight of said catalyst layer is 3.0 to 10 mL/g.

A first carbon dioxide electrolysis cell according to the embodiment comprises:
  an anode unit having an anode which oxidizes water or hydroxy ions into oxygen, and an anode solution-flow path through which an anode solution is supplied to said anode;
  a cathode unit having a cathode which is equipped with said catalyst layer and which reduces carbon dioxide into a carbon compound, and a gas-flow path through which carbon dioxide is supplied to said cathode; and
  a separator separating said anode unit and said cathode unit from each other.

A second carbon dioxide electrolysis cell according to the embodiment comprises:
  an anode unit having an anode which oxidizes water or hydroxy ions into oxygen, and an anode solution-flow path through which an anode solution is supplied to said anode;
  a cathode unit having a cathode which is equipped with said catalyst layer and which reduces carbon dioxide into a carbon compound, a cathode solution-flow path through which a cathode solution is supplied to said cathode, and a gas-flow path through which carbon dioxide is supplied to said cathode; and
  a separator separating said anode unit and said cathode unit from each other;
provided that
  said anode is so placed between said separator and said anode solution-flow path as to be in contact with them.

Figure 1:
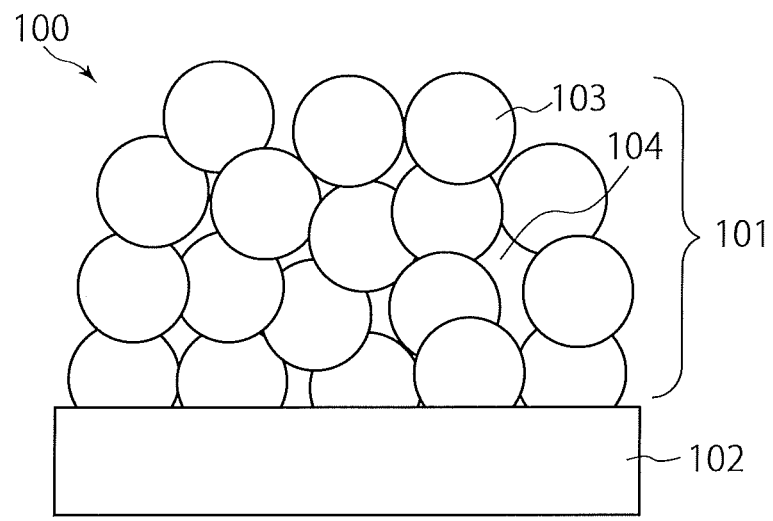
FIG. 1 is a schematic sectional view showing a structure example of a carbon dioxide reduction electrode.

FIG. 1 is a schematic sectional view showing a structure example of a carbon dioxide reduction electrode. An electrode catalyst layer 101 for a carbon dioxide electrolysis cell according to the embodiment is generally formed on an electrode substrate 102, and they are unified to function as an electrode 100 such as a cathodic electrode. The catalyst layer of the embodiment comprises carbonous catalyst carriers, a metallic catalyst loaded on the carriers and an ion-conductive material, and has a porous structure. This porous structure is characterized by the diameter distribution of pores contained therein. Specifically, if measured by a mercury injection method, the pore-diameter distribution in which the diameter and the logarithmic differential pore volume are plotted on the horizontal and vertical axes, respectively, shows a characteristic peak indicating pores of 5 to 200 μm diameters. Further, the pores of 5 to 200 μm diameters are found to have a volume of the pores of 3.0 to 10 mL/g. The electrode equipped with that catalyst layer realizes a high partial current density of a carbon compound, and exhibits high catalytic efficiency.

The reason why the above pore-diameter distribution causes increase of the partial current density is presumed to be as follows. There are numerous nanometer-sized pores inside and among the carbonous carriers, and those pores are connected to form flow paths of carbon dioxide in the catalyst layer. However, the flow paths are so winding that the gas cannot be fully delivered to the whole catalyst layer. If the catalyst layer contains relatively large pores of 5 to 200 μm diameters, the gas can migrate straight through the large pores and accordingly can diffuse rapidly in the whole catalyst layer. In addition, it is thought that the reduction product also migrates through the paths to be smoothly exhausted out of the catalyst layer and accordingly the reduction reaction of carbon dioxide proceeds efficiently.

In prior arts for PEFC, there are no proposals to introduce relatively large pores described above. That is presumed to be because of difference in the reaction proceeding in the catalyst layer. Specifically, since carbon dioxide has a larger molecular weight than oxygen, the effective diffusion coefficient of carbon dioxide is smaller that that of oxygen. Accordingly, in order to achieve a higher partial current density, the gas-flow path preferably has such a structure that the gas can diffuse efficiently. From that viewpoint, introduction of large pores can be said to be effective in diffusing the gas efficiently in the layer of a carbon dioxide electrolysis cell.

The aforementioned peak in the pore-diameter distribution is preferably observed in the diameter range of 5 to 200 μm. In a range smaller than that, the gas cannot be fully delivered to the whole catalyst layer. On the other hand, in a range larger than that, the catalyst layer may be poor in mechanical strength and/or electroconductivity. When the peak is located in the range of preferably 5 to 150 μm, more preferably 5 to 100 μm, the above two problems are balanced to obtain a catalyst layer more effective in reducing carbon dioxide The volume of the pores having diameters of 5 to 200 μm is 3.0 to 10 mL/g, preferably 3.0 to 8.0 mL/g, more preferably 3.0 to 6.0 mL/g. If the pore volume satisfies this condition, the gas diffusibility and the electroconductivity are balanced to obtain a catalyst layer more effective in reducing carbon dioxide. The pore volume can be estimated from an integrated value of the pore-diameter distribution curve in the diameter range of 5 to 200 μm.

It is here noted that the above pore-diameter distribution is obtained by measuring the catalyst layer alone. Accordingly, the objective catalyst layer is peeled and then measured. Otherwise, a catalyst layer for measurement is independently formed by coating a smooth substrate made of Si or the like and then the formed layer is alone taken off and subjected to the measurement. The obtained powdery layer is measured by a mercury injection method, and specifically the procedure is carried out according to JIS R 1655.

When the surface of the catalyst layer is observed with a scanning electron microscope (SEM), it can be confirmed that there are secondary particles formed by the catalyst carriers. As shown in FIG. 1, voids 104 among the secondary particles 103 correspond to the aforementioned pores of 5 μm or more diameters. Further, the secondary particles are aggregates of finer primary particles, and hence there are also fine voids inside and among the primary particles. Accordingly, since containing both of voids (pore diameter: 5 μm or more) among the secondary particles and finer ones (pore diameter: less than 5 μm in general) inside and among the primary particles (carbonous carriers), the catalyst layer can realize a higher partial current density.

In addition to pores among the carbonous catalyst carriers, the carries in themselves preferably have porous structures. Examples of materials adoptable as the carriers include: carbon black, such as, Ketjenblack and VULCAN XC-72; activated carbon; and carbon nanotubes. If having porous structures, the carriers can have large active surfaces contributing to the redox reaction and accordingly can enhance conversion efficiency.

The catalyst layer formed on the substrate has a thickness of preferably 5 to 200 μm, more preferably 5 to 150 μm, further preferably 5 to 100 μm. If satisfying this condition, the catalyst layer can realize high efficiency because the amount per area of the metallic catalyst is balanced with diffusion length of carbon dioxide. The thickness of the catalyst layer can be obtained by means of SEM observation and image-analysis of a section of the electrode.

The catalyst layer formed on the substrate has a weight per area of preferably 0.1 to 10 $mg/cm^2$, more preferably 0.1 to 8 $mg/cm^2$, further preferably 0.1 to 5 $mg/cm^2$. If satisfying this condition, the catalyst layer can realize high efficiency because the gas is prompted to diffuse. The weight per area of the catalyst layer can be obtained by subtracting the weight of the substrate from the total weight of the electrode comprising the substrate and the catalyst layer.

In order to supply carbon dioxide efficiently to the catalyst layer, it is preferred to form a gas diffusion layer on the electrode substrate 102, which supports the catalyst layer. The gas diffusion layer is made of electroconductive porous material. The porous material is preferably water-repellent because water produced by the reduction reaction and/or transferred from the oxidation side can be decreased and drained out through the reduction flow path and consequently the amount of carbon dioxide gas can be relatively increased in the porous material.

It is not preferred for the gas diffusion layer to have an extremely thin thickness because the cell plane deteriorates in evenness. On the other hand, it is also not preferred for the gas diffusion layer to be extremely thick because not only the material cost increases but also the resistance of gas diffusion increases to impair the efficiency. For the purpose of further improving the diffusibility, it is more preferred to form a finer diffusion layer (meso-porous layer) between the gas diffusion layer and the catalyst layer because the repellent ability and the porosity can be changed to promote diffusion of the gas and/or evacuation of the liquid.

The metallic catalyst loaded on the carriers is, for example, a substance lowering the activation energy for reducing hydrogen ions or carbon dioxide. In other words, the catalyst is, for example, a metallic material that lowers the overvoltage when carbon dioxide is reduced into a carbon compound. Specifically, the catalyst is preferably at least one metal selected from the group consisting of Au, Ag, Cu, Pt, Pd, Ni, Co, Fe, Mn, Ti, Cd, Zn, In, Ga, Pb, Sn and alloys thereof. However, the catalyst is not limited to those.

For example, Ru complexes and Re complexes can be adopted as a reduction catalyst. Further, plural materials can be mixed to use. The metallic catalyst may be in various forms, such as, planar form, mesh form, wire form, particle form, porous form, film form and island form.

When metal nanoparticles are adopted as the metallic catalyst, the mean diameter thereof is preferably 1 to 15 nm, more preferably 1 to 10 nm, further preferably 1 to 5 nm. The nanoparticles preferably satisfy this condition because the metal surface area per weight of the catalyst is large enough to exhibit high activity. Here, the mean diameter can be obtained by observing the nanoparticles with a transmission electron microscope (TEM) and analyzing the obtained TEM image. Specifically, the projection area of a metal nanoparticle is measured and then the diameter of a circle that has the same area as the measured projection area is regarded as the diameter of the nanoparticle. Diameters of plural nanoparticles are thus obtained and averaged to determine the mean diameter. In order to obtain a reliable value of the mean diameter, 100 or more of the metal nanoparticles are preferably subjected to the diameter measurement.

The metallic catalyst has a weight per area of preferably 0.01 to 5 mg/cm$^2$, more preferably 0.01 to 3 mg/cm$^2$, further preferably 0.01 to 1 mg/cm$^2$. If the catalyst satisfies this condition, the inside of the catalyst layer is hydrophobic enough to rapidly drain out water and the product. That is preferred. Here, the weight of the metallic catalyst can be measured by induced coupled plasma atomic emission spectroscopy (ICP-AES). Specifically, the metal in the catalyst layer is completely dissolved in an acidic solution, and then the obtained solution is measured as a sample.

The compound produced by the reduction reaction depends on the kind of the metallic catalyst serving as a reduction catalyst. Examples of the compound produced by the reduction reaction include: carbon compounds, such as, carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCOH) and ethylene glycol; and hydrogen.

Figure 2:
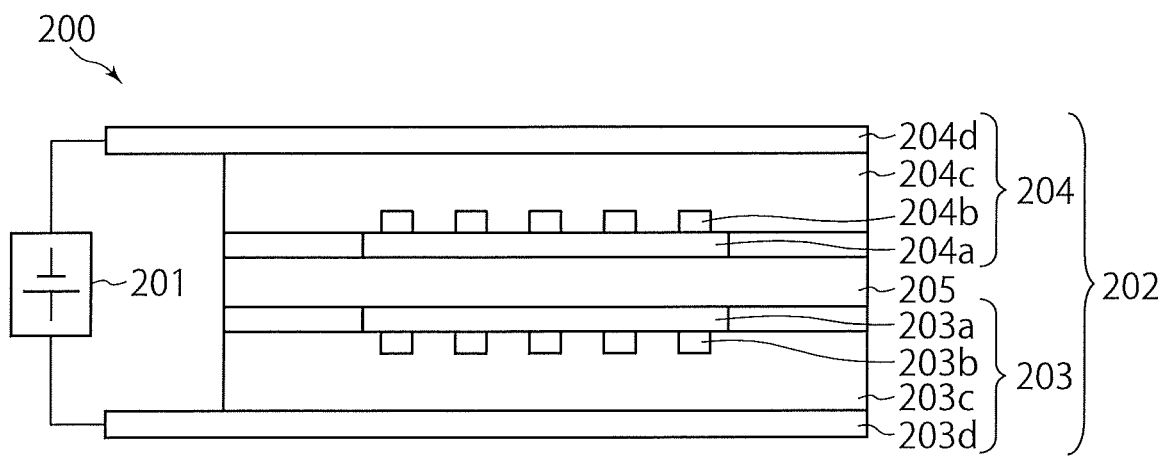
FIG. 2 is a schematic sectional view showing a structure example of a carbon dioxide electrolysis apparatus 200.

FIG. 2 is a schematic sectional view showing a structure example of a carbon dioxide electrolysis apparatus 200 according to the first embodiment. The apparatus employs the above reduction electrode. Specifically, the apparatus shown in FIG. 2 comprises an electric power unit 201 and a cell 202, and the cell comprises an anode unit 203, a cathode unit 204 and a separator 205. The anode unit 203 has an anode 203a, an anode solution-flow path 203b, and an anode current collector 203d. The anode solution-flow path is provided for the purpose of supplying an anode solution to the anode, and is formed of pits (grooves/furrows) carved on a first flow-path plate 203c. Meanwhile, the cathode unit 204 has a carbon dioxide reduction electrode (cathode) 204a equipped with the catalyst layer of the embodiment, a carbon dioxide-flow path 204b, and a cathode current collector 204d. The carbon dioxide-flow path is provided for the purpose of supplying carbon dioxide gas to the cathode, and is formed of pits (grooves/furrows) carved on a second flow-path plate 204c. The separator 205 is so placed as to separate the anode unit and the cathode unit from each other.

Figure 3:
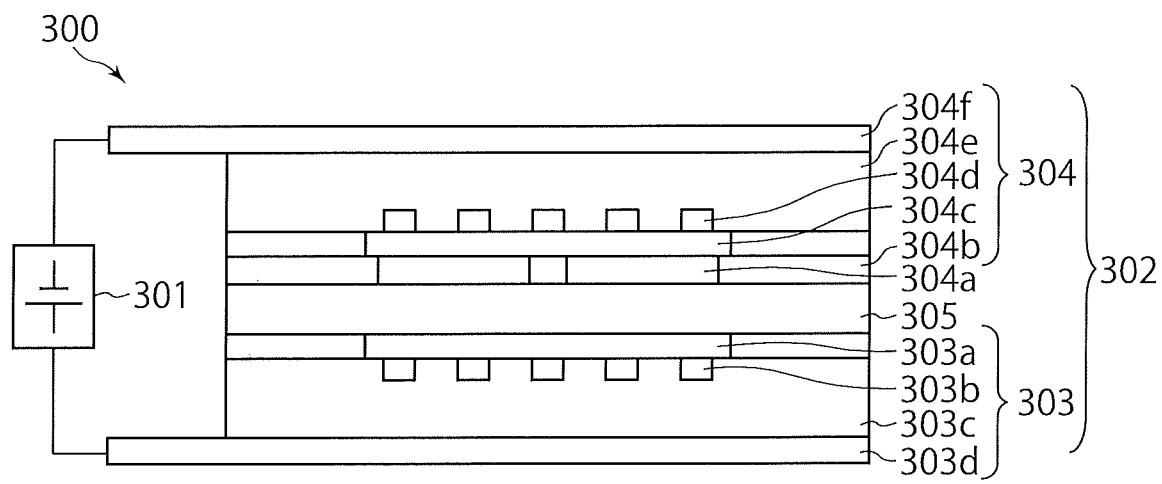
FIG. 3 is a schematic sectional view showing a structure example of a carbon dioxide electrolysis apparatus 300.

FIG. 3 is a schematic sectional view showing a structure example of a carbon dioxide electrolysis apparatus 300 according to the second embodiment. The apparatus also employs the above reduction electrode. Specifically, the apparatus shown in FIG. 3 comprises an electric power unit 301 and a cell 302, and the cell comprises an anode unit 303, a cathode unit 304 and a separator 305. The anode unit 303 has an anode 303a, an anode solution-flow path 303b, and an anode current collector 303d. The anode solution-flow path is provided for the purpose of supplying an anode solution to the anode, and is formed of pits (grooves/furrows) carved on a first flow-path plate 303c. Meanwhile, the cathode unit 304 has a carbon dioxide reduction electrode 304c equipped with the catalyst layer of the embodiment, a cathode solution-flow path 304a, a carbon dioxide gas-flow path 304d, and a cathode current collector 304f. The carbon dioxide gas-flow path 304d is provided for the purpose of supplying carbon dioxide gas to the cathode, and is formed of pits (grooves/furrows) carved on a second flow-path plate 304e. The cathode solution-flow path 304a is formed of openings carved on a third flow-path plate 304b. The separator 305 is so placed as to separate the anode unit and the cathode unit from each other. The cathode solution-flow path is so placed between the cathode and the separator that the cathode solution can be brought into contact with the cathode and the separator.

In the cathode of the electrolysis cell 200, the anode solution and ions are supplied through the separator while $CO_2$ gas is supplied through the $CO_2$ gas-flow path. The $CO_2$ reduction product is evacuated mainly through the $CO_2$ gas-flow path. On the other hand, in the cathode of the electrolysis cell 300, the cathode solution and ions are supplied through the cathode solution-flow path while $CO_2$ gas is supplied through the $CO_2$ gas-flow path. The gaseous $CO_2$ reduction product is evacuated mainly through the $CO_2$ gas-flow path, and the liquid product is evacuated mainly through the cathode solution-flow path. Accordingly, the electrolysis cell 300 is preferably employed when the product is a liquid carbon compound, such as, formic acid (HCOOH), methanol ($CH_3OH$), ethanol ($C_2H_5OH$), formaldehyde (HCOH) or ethylene glycol. Those products are dissolved in the cathode solution, and thereby can be easily recovered.

The flow-path plates 203c and 303c, which form anode solution-flow paths, and the flow-path plates 204c and 304c, which form $CO_2$ gas-flow paths, are preferably made of materials having low chemical reactivity and high electroconductivity. Examples thereof include: metal materials such as Ti and SUS; and carbon. The third flow-path plate 304b, which forms the cathode solution-flow path, is preferably made of materials having low chemical reactivity and no electroconductivity. Examples thereof include insulating resin materials such as acrylic resin, polyetherether ketone (PEEK) and fluorine resin.

Each of the electrolysis cells 200 and 300 is generally sandwiched between a pair of support plates (not shown), and tightened with bolts or the like. In FIGS. 2 and 3, the reference numerals 201 and 301 indicate electric power units supplying electric currents to the anodes and the cathodes. The electric power units and the electrolysis cells together constitute the carbon dioxide electrolysis apparatuses according to the embodiment. The power units are not limited to normal batteries or commercial power supplies, and may supply electric power generated by renewable energy of solar cells, wind power generation or the like. It is ecologically preferred to use renewable energy in combination with the effective utilization of carbon dioxide.

The anode is an electrode (oxidation electrode) which promotes oxidation reaction of water ($H_2O$) in the anode solution to produce oxygen ($O_2$) or hydrogen ions ($H^+$) or which promotes oxidation reaction of hydroxy ions ($OH^-$) generated in the cathode unit to produce oxygen or water. The anode is so placed between the separator and the anode solution-flow path as to be in contact with them. Specifically, the anode has one face in contact with the separator and the other face in contact with the anode solution-flow path. The first face keeps in close contact with the separator. The first flow-path plate connects to a solution inlet and a solution outlet (which are both not shown), and the anode solution is introduced and evacuated through them, respectively, with a pump (not shown). The anode solution so flows in the anode solution-flow path as to be in contact with the anode. The anode current collector electrically connects to the first flow-path plate, which forms the anode solution-flow path, on the side opposite to the anode.

The compound produced by the oxidation reaction on the anode depends on the kind of the oxidation catalyst. When an electrolyte aqueous solution is used, the anode can oxidize water ($H_2O$) into oxygen or hydrogen ions or can oxidize hydroxy ions ($OH^-$) into water or oxygen. Accordingly, the oxidation catalyst is preferably mainly made of catalytic material (anode catalyst material) capable of lowering the overvoltage of those reactions. Examples of the catalytic material include: metals, such as, platinum (Pt), palladium (Pd), and nickel (Ni); alloys and intermetallic compounds thereof; binary metal oxides, such as, manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O), lithium oxide (Li—O), and lanthanum oxide (La—O); ternary metal oxides, such as, Ni—Co—O, Ni—Fe—O, La—Co—O, Ni—La—O, and Sr—Fe—O; quaternary metal oxides, such as, Pb—Ru—Ir—O and La—Sr—Co—O; and metal complexes, such as, Ru complexes and Fe complexes.

The anode is preferably equipped with a substrate having a structure through which the anode solution and ions can migrate between the separator and the electrolyte-solution flow path. For example, the substrate has a porous structure such as a mesh plate, a punching plate or a porous plate. The substrate having a porous structure may be a metal fiber sintered plate, which contains relatively large voids. The substrate may be made of metallic material, such as, titanium (Ti), nickel (Ni), iron (Fe) or an alloy (e.g., SUS) containing at least one of them, or of the above-described anode catalyst material. When an oxide is adopted as the anode catalyst material, the anode catalyst material is preferably attached or layered on the substrate made of the above metallic material so as to form the catalyst layer. In view of enhancing the oxidation reaction, the anode catalyst material is preferably in the form of nanoparticles, nanostructures or nanowires. Here, the "nanostructures" means structures obtained by forming nanoscale surface roughness on the catalyst material. The oxidation catalyst is not necessarily formed on the oxidation electrode. The oxidation catalyst layer may be formed on a place other than the oxidation electrode and electrically connected to the oxidation electrode.

As the anode and cathode solutions, aqueous solutions containing desired electrolytes can be adopted. Examples of the electrolyte-containing aqueous solutions include: aqueous solutions containing phosphate ions ($PO_4^{2-}$), borate ions ($BO_3^{3-}$), sodium ions ($Na^+$), potassium ions ($K^+$), calcium ions ($Ca^{2+}$), lithium ions ($Li^+$), cesium ions ($Cs^+$), magnesium ions ($Mg^{2+}$), chloride ions ($Cl^-$), or hydrogen carbonate ions ($HCO_3^-$). In addition, aqueous solutions containing $LiHCO_3$, $NaHCO_3$, $KHCO_3$, $CsHCO_3$, phosphoric acid or boric acid are also employable.

Particularly as the cathode solution, it is also possible to use an ionic liquid, which is in the form of liquid in a wide temperature range, comprising an anion such as $BF_4^-$ or $PF_6^-$ and a cation such as imidazolium ion or pyridinium ion; or an aqueous solution thereof. In addition, amines, such as ethanolamine, imidazole and pyridine, or aqueous solutions thereof can be employed as the cathode solution. They may be primary, secondary or tertiary amines.

The separator is made of an ion-exchange membrane or the like though which ions can migrate between the anode and the cathode and which can separate the anode unit and the cathode unit from each other. Examples of the ion-exchange membrane include: cation-exchange membranes of Nafion and Flemion, and anion-exchange membranes of Neosepta, Selemion or Sustainion. When an alkali solution is adopted as the electrolyte solution on the assumption that hydroxy ions ($OH^-$) mainly migrate therein, the separator is preferably made of an anion-exchange membrane. The ion-exchange membrane may be a film comprising a basic skeleton of hydrocarbon or a film having amino groups. However, the separator is not necessarily made of an ion-exchange membrane as long as ions can migrate between the anode and the cathode, and hence salt brides, glass filters, porous polymer films or porous insulating materials, for example, can be adopted as the separator. Here, it should be noted that, if the gas flows between the cathode unit and the anode unit, the reduction product may be again oxidized to cause a circular reaction. In view of that, the gas is preferably hardly exchanged between the cathode unit and the anode unit. Accordingly, attention is needed when a porous thin membrane is used as the separator.

In order to ensure electric contact with the cathode, the carbon dioxide-flow path can be equipped with a land in contact with the cathode. For example, the flow path may be provided with only a columnar land, or may have a serpentine structure in which the path is long, slender and winding. However, there are no particular restrictions on the structure of the flow path as long as it has a hollow cross-section. The flow path preferably comprises plural parallel channels, serpentine channels or a combination thereof because the gas flows so evenly on the cell plane that the reaction can proceed homogeneously on the cell plane.

The flow path preferably has a shallow depth for the purposes of supplying carbon dioxide to the gas-diffusion layer, of draining out the liquids and of making the reaction proceed homogeneously on the cell plane. However, it is not preferred for the flow path to be extremely narrow. That is because the narrow path tends to induce increase of pressure damages in the path. The damages increase energy loss of gas supply, and further the gas leaks to flow not only through the path but also through the gas-diffusion layer, so as to disturb the homogeneous reaction on the cell plane.

The following explains an operation example of the carbon dioxide electrolysis apparatus 200. In the case mainly explained below, carbon monoxide (CO) is produced as the carbon compound. However, the carbon compound as a reduction product from carbon dioxide is not limited to carbon monoxide. As described above, the carbon compound may be methane ($CH_4$), ethane ($C_2H_6$), ethylene ($C_2H_4$), methanol ($CH_3OH$), ethanol ($C_2H_5OH$), ethylene glycol ($C_2H_6O_2$) or the like. Further, carbon monoxide as a reduction product may be further reduced into the above carbon compound. Also as described above, when the carbon compound is produced in the form of liquid, the electrolysis cell 300 is preferably employed. The reaction process in the electrolysis cell can be thought to be of two types, in one of which hydrogen ions ($H^+$) are mainly produced and in the other of which hydroxy ions ($OH^-$) are mainly produced. The reaction process is, however, by no means limited to either of them.

First, the reaction process in which water ($H_2O$) is mainly oxidized to produce hydrogen ions ($H^+$) is described below. When the power unit supplies electric currents to between the anode and the cathode, an oxidation reaction of water starts on the anode in contact with the anode solution. Specifically, as shown in the following formula (1), $H_2O$ contained in the anode solution is oxidized into oxygen ($O_2$) and hydrogen ions ($H^+$).

$$2H_2O \rightarrow 4H^+ + O_2 + 4e^- \quad (1)$$

The hydrogen ions ($H^+$) produced on the anode migrate in the electrolyte solution in the anode, penetrate through the separator, and then reach near the cathode. The hydrogen ions ($H^+$) thus transferred to near the cathode then participate in the reduction reaction of carbon dioxide ($CO_2$) together with electrons ($e^-$) based on the currents supplied from the power unit. Specifically, as shown in the following formula (2), $CO_2$ supplied from the $CO_2$ gas-flow path to the cathode is reduced into CO. Otherwise, as shown in the following formula (3), the hydrogen ions ($H^+$) accept electrons to produce hydrogen, which may be generated together with carbon monoxide.

$$CO_2 + 2H^+ + 2e^- \rightarrow CO + H_2O \quad (2)$$

$$2H^+ + 2e^- \rightarrow H_2 \quad (3)$$

Next, the reaction process in which carbon dioxide ($CO_2$) is mainly reduced to produce hydroxy ions ($OH^-$) is described below. When the power unit supplies electric currents to between the anode and the cathode, water ($H_2O$) and carbon dioxide ($CO_2$) are reduced near the cathode to produce carbon monoxide (CO) and hydroxy ions ($OH^-$), as shown in the following formula (4). Otherwise, as shown in the following formula (5), water accepts electrons to produce hydrogen, which may be generated together with carbon monoxide. The hydroxy ions ($OH^-$) thus generated in those reactions diffuse to near the anode, and are oxidized as shown in the following formula (6) to produce oxygen ($O_2$).

$$2CO_2 + 2H_2O + 4e^- \rightarrow 2CO + 4OH^- \quad (4)$$

$$2H_2O + 2e^- \rightarrow H_2 + 2OH^- \quad (5)$$

$$4OH^- \rightarrow 2H_2O + O_2 + 4e^- \quad (6)$$

The above-described carbon dioxide electrolysis apparatus according to the embodiment can be not only specialized in reduction of carbon dioxide but also adopted for producing a reduction product of carbon dioxide and hydrogen in a desired ratio. For example, it can be employed for producing carbon monoxide and hydrogen in a ratio of 1:2, which are then subjected to a reaction to produce methanol.

Since hydrogen is inexpensively and easily available from electrolysis of water or from fossil fuels, the production ratio thereof does not need to be high. In view of that, the ratio of carbon monoxide to hydrogen is at least 1 or more, preferably 1.5 or more from the ecological and economic viewpoint.

EXAMPLES

Example 1

In accordance with the following procedures, a carbon dioxide electrolysis apparatus shown in FIG. 2 was assembled.

The cathode catalyst layer was formed by spray-coating. The adopted electrode substrate was a sheet of carbon paper having a diffusion layer equipped with a microporous layer. First, carbon particles loaded with gold nanoparticles, pure water, isopropanol and a Nafion solution were mixed in a predetermined ratio to prepare a coating solution. The gold nanoparticles had a mean particle size of 3.4 nm, and the loaded amount thereof was 21.6 mass %. The coating solution was held in a spray-nozzle, and sprayed onto the carbon paper spread on a heated hot-plate to carry out the spray-coating. In this procedure, the rate of supplying the solution was controlled so as to eject as small droplets as possible. Further, the coating speed and the gap between the nozzle and the paper were controlled so that the droplets might be dried rapidly on the paper. Subsequently, the coated paper was washed with flowing pure water for 30 minutes, and then immersed in a hydrogen peroxide solution to oxidize and remove residual organic substances. The resultant paper was cut into a 2×2 cm piece to produce a cathode (electrode area: 4 cm²). The coating amounts of carbon and Au were estimated to be about 0.55 mg/cm² and about 0.16 mg/cm², respectively, from the contents of the carbon particles and the gold nanoparticles in the coating solution.

Figure 4:
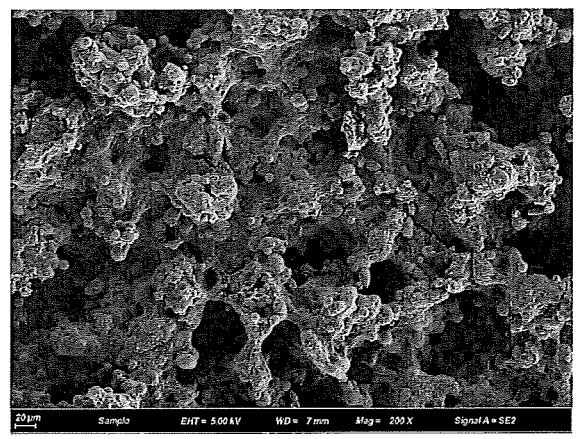
FIG. 4 is a scanning electron microscopic image of the electrode catalyst layer surface obtained in Example 1.
Figure 5:
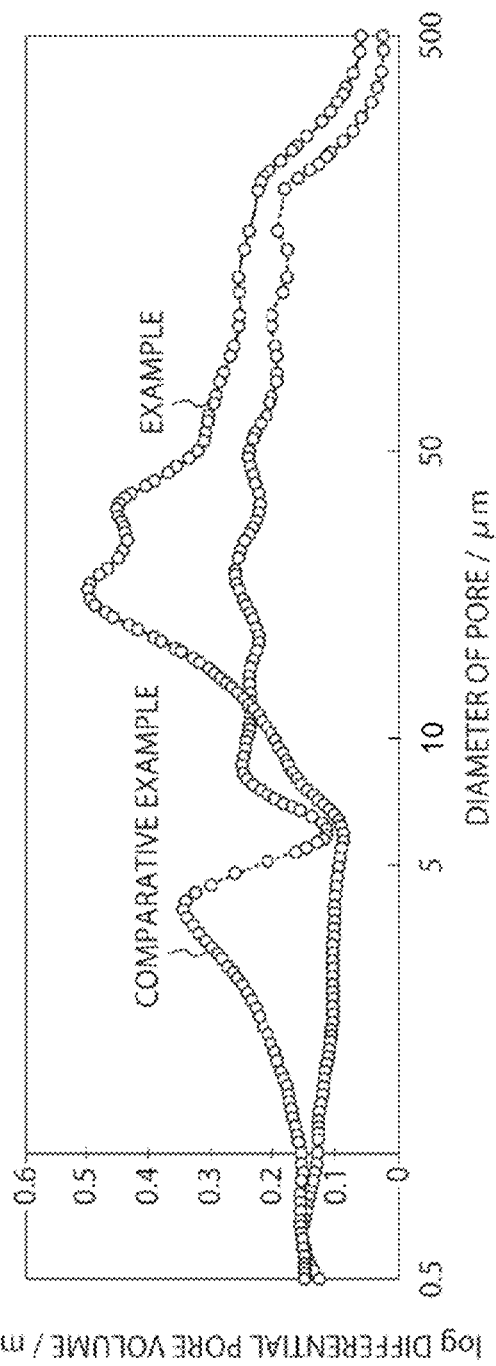
FIG. 5 is a graph showing pore-diameter distributions of the electrode catalyst layers obtained in Example 1 and Comparative example 1.

FIG. 4 shows a SEM observation result of the electrode surface obtained in Example 1. From the image, it was verified that the catalyst layer contained secondary particles formed by the catalyst carriers. In addition, from the observation of the section, the thickness of the catalyst layer was estimated to be about 60 μm. FIG. 5 shows a pore-diameter distribution of the catalyst layer measured by a mercury injection method. The measurement was carried out by means of Autopore IV9520 ([trademark], manufactured by Shimadzu Corporation). In this measurement, a catalyst layer was formed on a Si substrate in the same manner as described above, and then peeled, powdered, and dried at 120° C. for 3 hours to prepare the measurement sample. As a result, it was confirmed that the distribution had a peak in the diameter range of 5 to 200 μm.

The adopted anode was an electrode formed by coating a Ti mesh with $IrO_2$ nanoparticles serving as the catalyst.

The $IrO_2$/Ti mesh was then cut into a 2×2 cm piece to produce an anode.

Subsequently, the electrolysis cell was produced by: stacking, in the order from the top, a cathode current collector, a carbon dioxide gas-flow path, the cathode, a separator, the anode, an electrolyte-solution flow path, and an anode current collector; sandwiching the stack between support plates not shown; and tightening the stack with bolts. As the separator, an anion-exchange membrane (Sustainion [trademark], manufactured by Dioxide Materials) was adopted. The anode and cathode current collectors were connected to an external power supply unit. In this way, the electrolysis apparatus shown in FIG. 2 was assembled.

Figure 6:
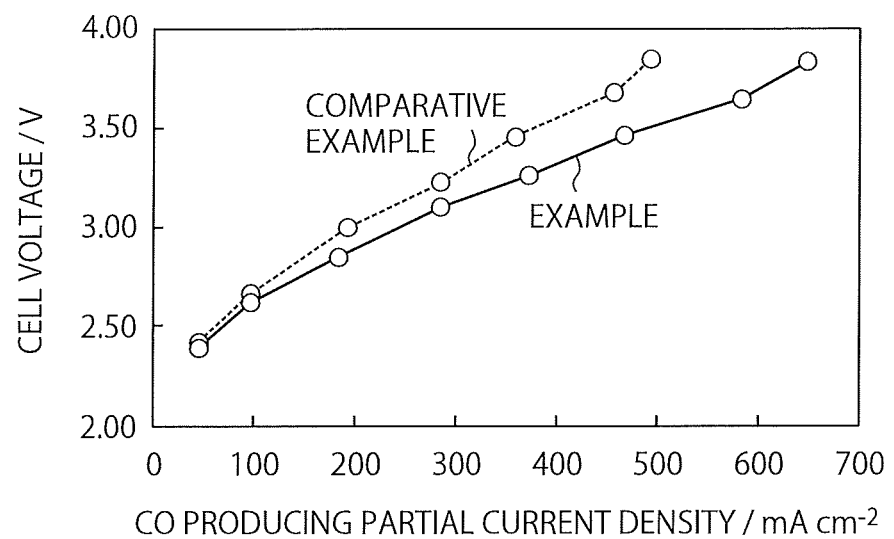
FIG. 6 shows experimental results of electrodes obtained in Example 1 and Comparative example 1.

The electrolysis apparatus shown in FIG. 2 was operated under the following conditions. While the carbon dioxide gas-flow path was supplied with carbon dioxide in a predetermined amount, an aqueous solution of sodium hydrogen carbonate (concentration: 0.1 M) was led to flow in the electrolyte-solution flow path. Meanwhile, a constant current of 12.5, 50, 100, 200, 300, 400, 500, 600, or 700 mAcm$^{-2}$ was continuously applied to between the anode and the cathode for 10 minutes. The gas generated from the cathode side was collected 5 minutes after each current was applied, to measure the conversion efficiency of carbon dioxide. Further, the generated gas was sampled and then assigned and quantified by means of gas-chromatography. In this procedure, the voltage and the partial current densities of generated hydrogen and carbon monoxide were individually measured. As the result of the above operation, hydrogen and carbon monoxide were produced and the total of the partial current densities thereof were almost corresponding to the above current density. FIG. 6 shows a graph in which the voltage is plotted against the partial current density of carbon monoxide. The maximum partial current density was found to be 645 mAcm$^{-2}$ under those conditions.

Comparative Example 1

Figure 7:
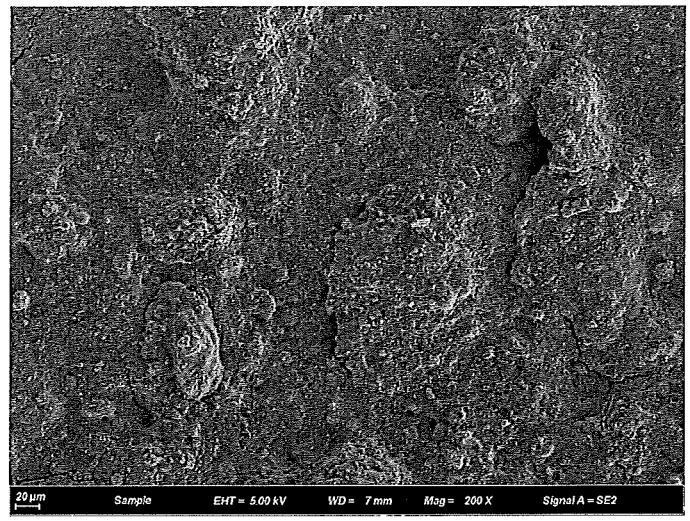
FIG. 7 is a scanning electron microscopic image of the electrode catalyst layer surface obtained in Comparative example 1.

The procedures of Example 1 were repeated except for changing the coating conditions to form a catalyst layer having a different pore-diameter distribution. Specifically, the rate of supplying the solution was changed so as to eject as large droplets as possible. Further, the coating speed and the gap between the nozzle and the paper were changed so that it might take long time to dry the ejected solution. Thereafter, the cathode was produced in the same manner as in Example 1. FIG. 5 shows a pore-diameter distribution measured by a mercury injection method. The measurement sample was produced also in the same manner as in Example 1. The cathodes of Example 1 and Comparative example 1 exhibit almost the same distributions in the diameter range of 0.5 µm or less. However, it is revealed that, although there are many pores in the diameter range of 5 to 200 µm in Example 1, the number of pores in that range is smaller in Comparative example 1. FIG. 7 shows a SEM observation result of the electrode surface obtained in Comparative example 1. In that image, secondary particles observed in FIG. 4 are not found. This means that, in the catalyst layer in Example 1, the secondary particles are connected to form many pores of 5 to 200 µm diameters.

The obtained cathode was used to produce a carbon dioxide electrolysis apparatus shown in FIG. 2 in the same manner as in Example 1. The electrolysis apparatus was then operated under the same conditions as those of Example 1. The results are shown in FIG. 6. The maximum partial current density was found to be 492 mAcm$^{-2}$, which is lower than that in Example 1. From the resultant pore-diameter distribution, it is presumed that pores of 5 to 200 µm diameters contribute toward improvement of the current density.

DESCRIPTION OF THE REFERENCE NUMERALS

100: carbon dioxide reduction electrode,
101: catalyst layer for a carbon dioxide electrolysis cell,
102: electrode substrate,
103: secondary particle,
104: void,
200: carbon dioxide electrolysis apparatus,
201: electric power unit,
202: cell,
203: anode unit,
203a: anode,
203b: anode solution-flow path,
203c: first flow-path plate,
203d: anode current collector,
204: cathode unit,
204a: carbon dioxide reduction electrode,
204b: carbon dioxide gas-flow path,
204c: second flow-path plate,
204d: cathode current collector,
205: separator
300: carbon dioxide electrolysis apparatus,
301: electric power unit,
302: cell,
303: anode unit,
303a: anode,
303b: anode solution-flow path,
303c: first flow-path plate,
303d: anode current collector,
304: cathode unit,
304a: cathode solution-flow path
304b: third flow-path plate
304c: carbon dioxide reduction electrode,
304d: carbon dioxide gas-flow path,
304e: second flow-path plate,
304f: cathode current collector,
305: separator While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and sprit of the invention.

The invention claimed is:

1. An electrode suitable for a carbon dioxide electrolysis cell, comprising:
   a substrate; and
   an electrode catalyst layer comprising (i) carbonaceous catalyst carriers, and (ii) a metallic catalyst loaded on the carbonaceous catalyst carriers,
   wherein the metallic catalyst comprises Au, Ag, Cu, Pt, Pd, Ni, Co, Fe, Mn, Ti, Zn, and/or Ga, as a metal,
   wherein the catalyst layer comprises primary particles of the carbonaceous catalyst carriers which are aggregated to form secondary particles,
   the catalyst layer has a porous structure comprising pores of a diameter less than 5 µm inside and among the primary particles and pores of 5 to 200 µm among the secondary particles, diameters measured by a mercury injection method,
   wherein a volume of the pores having a diameter of 5 to 200 µm among the secondary particles per weight of the catalyst layer is in a range of from 3.0 to 10 mL/g, and
   wherein the pore-diameter distribution measured by a mercury injection method shows the highest peak of frequency distribution in the diameter range of from greater than 10 µm to less than 50 µm, provided that the diameter and the logarithmic differential pore volume are plotted on the horizontal and vertical axes, respectively.

2. The electrode of claim 1, wherein the secondary particles of the carbonaceous catalyst carriers have a mean particle diameter in a range of from 5 to 50 µm.

3. The electrode of claim 1, wherein the primary particles of the carbonaceous catalyst carriers comprise carbon particles, carbon nanotubes, and/or graphenes.

4. The electrode of claim 1, wherein the metallic catalyst comprises the Au, as a metal; and
   wherein the metal is in the form of nanoparticles, nanostructures, and/or nanowires.

5. The electrode of claim 1, wherein the metal is in the form of nanoparticles having a mean diameter in a range of from 1 to less than 5 nm.

6. The electrode of claim 1, wherein the metallic catalyst has a weight per area of the electrode catalyst layer in a range of from 0.01 to 5 mg/cm$^2$.

7. The electrode of claim 1, wherein the catalyst layer further comprises an ion-conductive material.

8. The electrode of claim 7, wherein the ion-conductive material is an anion-exchange resin or a cation exchange resin.

9. The electrode of claim 1, wherein the catalyst layer has a thickness in a range of from 5 to 200 μm.

10. The electrode of claim 1, wherein the catalyst layer has a weight per area in a range of from 0.1 to 10 mg/cm$^2$.

11. An electrolysis cell, comprising:
an anode unit comprising an anode suitable to oxidize water or hydroxy ions into oxygen, and an anode solution-flow path through which an anode solution is supplied to the anode;
a cathode unit comprising a cathode comprising a catalyst layer and being suitable to reduce carbon dioxide into a carbon compound, and a gas-flow path through which carbon dioxide is supplied to the cathode; and
a separator arranged to separate the anode unit and the cathode unit from each other,
wherein the catalyst layer comprises a carbonaceous catalyst carrier and a metallic catalyst loaded on the carbonaceous catalyst carrier,
wherein the metallic catalyst comprises Au, Ag, Cu, Pt, Pd, Ni, Co, Fe, Mn, Ti, Zn, and/or Ga, as a metal,
wherein the catalyst layer comprises primary particles of the carbonaceous catalyst carriers which are aggregated to form secondary particles,
the catalyst layer has a porous structure comprising pores of a diameter less than 5 μm inside and among the primary particles and pores of 5 to 200 μm among the secondary particles, diameters measured by a mercury injection method,
wherein a volume of the pores having a diameter of 5 to 200 μm among the secondary particles per weight of the catalyst layer is in a range of from 3.0 to 10 mL/g, and
wherein the pore-diameter distribution measured by a mercury injection method shows the highest peak of frequency distribution in the diameter range of from greater than 10 μm to less than 50 μm, provided that the diameter and the logarithmic differential pore volume are plotted on the horizontal and vertical axes, respectively.

12. The electrolysis cell if claim 11, wherein the anode solution comprises at least one selected from the group consisting of hydroxy ion, hydrogen ion, potassium ion, sodium ion, lithium ion, chloride ion, bromide ion, iodide ion, nitrate ion, sulfate ion, phosphate ion, borate ion, and hydrogen carbonate ion.

13. The electrolysis cell of claim 11, wherein the separator is at least one selected from the group consisting of a cation exchange membrane, an anion exchange membrane, and a porous membrane.

14. A carbon dioxide electrolysis apparatus, comprising:
the electrolysis cell of claim 11; and
an electric power unit configured to supply electric current between the anode and the cathode in the electrolysis cell.

15. An electrolysis cell, comprising:
an anode unit comprising an anode suitable to oxidize water or hydroxy ions into oxygen, and an anode solution-flow path through which an anode solution is supplied to the anode;
a cathode unit comprising a cathode comprising a catalyst layer and being suitable to reduce carbon dioxide into a carbon compound, a cathode solution-flow path through which a cathode solution is supplied to the cathode, and a gas-flow path through which carbon dioxide is supplied to the cathode; and
a separator arranged to separate the anode unit and the cathode unit from each other;
provided that
the anode is so placed between the separator and the anode solution-flow path as to be in contact with them,
wherein the catalyst layer comprises primary particles of the carbonaceous catalyst carriers which are aggregated to form secondary particles,
the catalyst layer has a porous structure comprising pores of a diameter less than 5 μm inside and among the primary particles and pores of 5 to 200 μm among the secondary particles, diameters measured by a mercury injection method,
wherein a volume of the pores having a diameter of 5 to 200 μm among the secondary particles per weight of the catalyst layer is in a range of from 3.0 to 10 mL/g, and
wherein the pore-diameter distribution measured by a mercury injection method shows the highest peak of frequency distribution in the diameter range of from greater than 10 μm to less than 50 μm, provided that the diameter and the logarithmic differential pore volume are plotted on the horizontal and vertical axes, respectively.

16. The electrolysis cell of claim 15, wherein the cathode is so placed between the cathode solution-flow path and the gas-flow path as to be in contact with them, and
wherein the cathode solution-flow path is so placed between the separator and the cathode as to be in contact with them.

17. The electrolysis cell of claim 15, wherein the anode and cathode solutions comprise at least one selected from the group consisting of hydroxy ion, hydrogen ion, potassium ion, sodium ion, lithium ion, chloride ion, bromide ion, iodide ion, nitrate ion, sulfate ion, phosphate ion, borate ion, and hydrogen carbonate ion.

18. The electrolysis cell of claim 15, wherein the separator is at least one selected from the group consisting of a cation exchange membrane, an anion exchange membrane, and a porous membrane.

19. A carbon dioxide electrolysis apparatus, comprising:
the electrolysis cell of claim 15; and
an electric power unit configured to supply electric current between the anode and the cathode in the electrolysis cell.

* * * * *